United States Patent [19]
Maxted

[11] 4,044,897
[45] Aug. 30, 1977

[54] CONVEYOR SORTING AND ORIENTING SYSTEM

[75] Inventor: Wesley R. Maxted, Grand Rapids, Mich.

[73] Assignee: Rapistan Incorporated, Grand Rapids, Mich.

[21] Appl. No.: 646,237

[22] Filed: Jan. 2, 1976

[51] Int. Cl.² .......................................... B65G 47/00
[52] U.S. Cl. ................................ 214/11 R; 198/448; 198/786
[58] Field of Search ............. 214/11 R; 198/357, 448, 198/786, 790

[56] References Cited
U.S. PATENT DOCUMENTS

| 1,581,120 | 4/1926 | Hitchcock | 198/790 |
|---|---|---|---|
| 1,826,832 | 10/1931 | Sekulski | 198/786 |
| 1,946,458 | 2/1934 | Evans et al. | 198/448 |
| 2,030,816 | 2/1936 | Fenton | 198/786 |
| 2,880,891 | 4/1959 | Carroll | 214/11 R |
| 3,138,238 | 6/1964 | Good et al. | 198/786 |
| 3,141,540 | 7/1964 | Burkhardt | 214/11 R X |
| 3,223,225 | 12/1965 | Clark et al. | 198/357 |
| 3,224,557 | 12/1965 | Beecher | 214/11 R |
| 3,880,298 | 4/1975 | Habegger et al. | 214/11 R |

FOREIGN PATENT DOCUMENTS 1,215,052  4/1960  France .................. 198/448

*Primary Examiner*—Robert J. Spar
*Assistant Examiner*—R. B. Johnson
*Attorney, Agent, or Firm*—Price, Heneveld, Huizenga & Cooper

[57] ABSTRACT

A high speed sorting system includes a plurality of induction conveyors capable of depositing cartons sequentially and in a spaced relationship onto a merge conveyor. The merge conveyor includes a pair of angled roller sections which bias each carton toward the center of the merge conveyor for intake onto an alignment conveyor. The alignment conveyor includes a plurality of angled rollers and thereby biases each carton toward one lateral edge of the conveyor. Each carton is then discharged onto a main outlet conveyor which includes a plurality of longitudinally spaced diverter mechanisms. Positioned adjacent each diverter mechanism is a destination conveyor. A control system is provided for proper sequencing of each carton onto the merge conveyor and for operation of the diverter so that each carton may be directed to a preselected destination conveyor.

8 Claims, 6 Drawing Figures

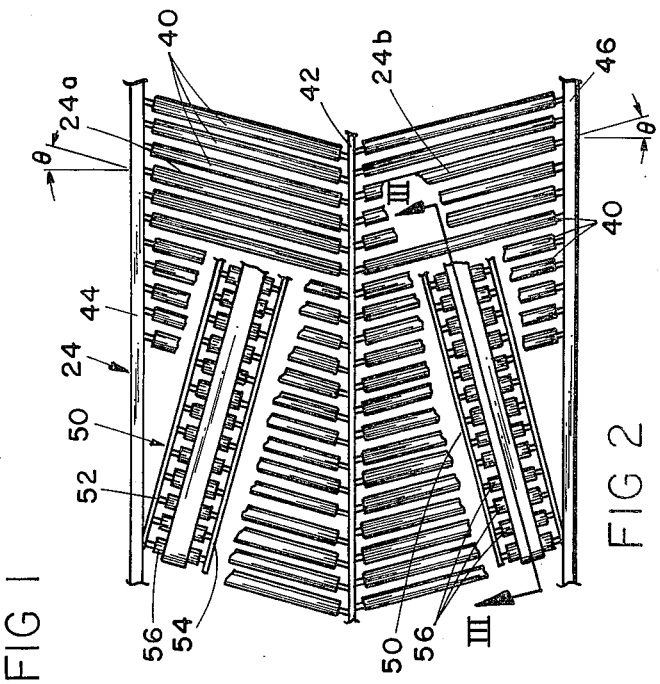
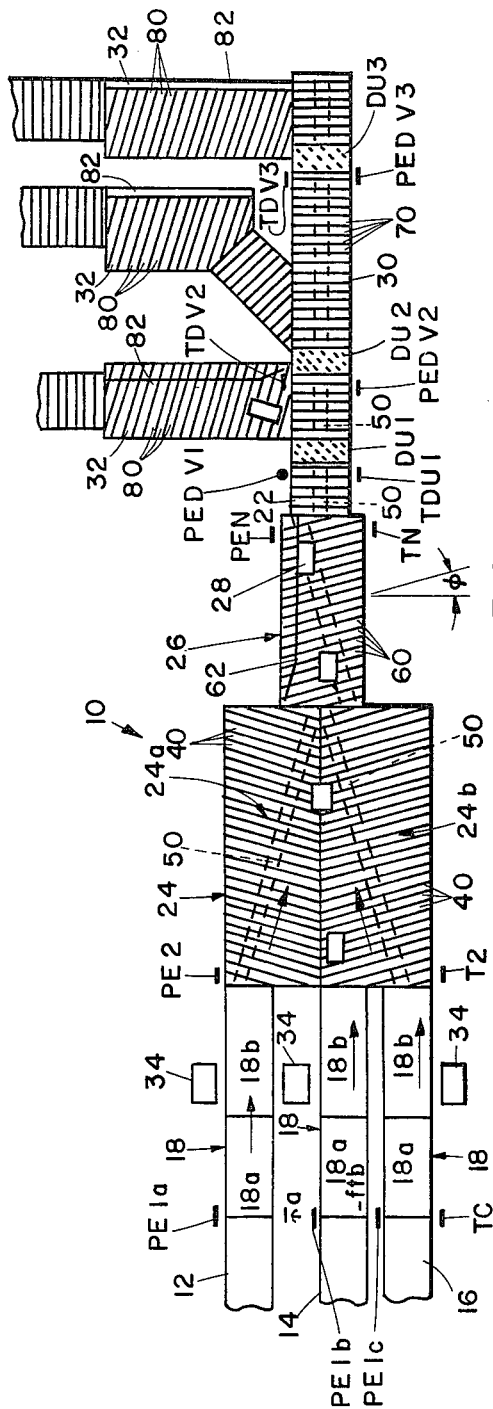
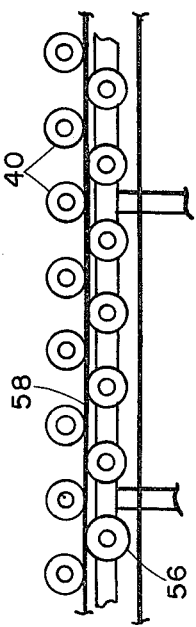
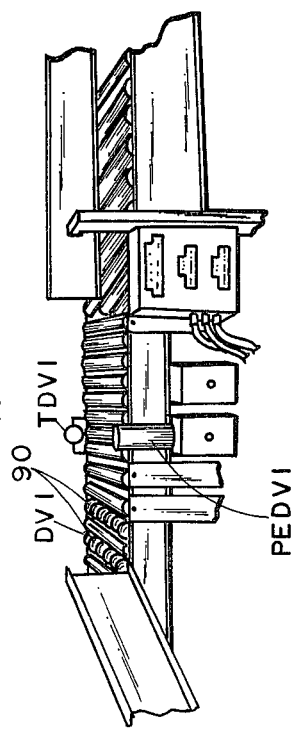

CONVEYOR SORTING AND ORIENTING SYSTEM

BACKGROUND OF THE INVENTION

This invention relates to conveyor systems, and more particularly to a unique, high speed carton sorting conveyor system.

Recently, efforts have been made in the area of distribution warehousing to increase the degree of automation in the handling of packages or cartons. The goal in these efforts has been to more efficiently fill orders at the warehouse and direct the desired units or numbers of individual packages and cartons to the proper location at a loading dock. Generally, a plurality of different products such as stereo receivers, tape recorders, turntables, etc. may be packaged in different cartons with the contents of each carton marked thereon. These cartons would be stored in different locations in a warehousing area. Customer orders received at the warehouse would require different numbers of each product to be delivered to a loading dock area for transportation to the customer. With small warehousing concerns, employees will manually remove the required number of products from a storage area to fill each order. This manual process is time consuming, inefficient and therefore relatively expensive.

In larger warehousing operations employing automatic or semi-automatic conveyor equipment, a sorting system may be employed to direct individual packages to the proper destination conveyors. A typical sorting system is disclosed in U.S. Pat. No. 3,034,665 to Speaker, entitled CONVEYOR SYSTEM and issued on May 15, 1962. As shown therein, a generally circular or endless conveyor is employed in conjunction with a plurality of trays, a tray tilting mechanism and a control system for encoding destination information and selectively actuating the tilt mechanisms to discharge a package or carton onto a destination conveyor. These systems have been effective in increasing the rate at which orders may be filled. Consequently warehousing concerns have been more efficiently operated. As the size of the warehouses has increased, however, a need has been demonstrated for a sorting system capable of increased capacity. Such a system preferably should have the qualities of reduced complexity, reduced manufacturing costs, increased ease of manufacture and increased reliability.

SUMMARY OF THE INVENTION

In accordance with the present invention, a unique high speed sorting system is provided by which the problems heretofore experienced with prior systems are substantially eliminated. Essentially, the high speed sorting system includes a plurality of two section induction conveyors which are adapted to receive singulated packages from infeed conveyors. The induction conveyors are sequentially operated so as to feed individual cartons in a spaced relationship onto a longitudinally extending merge conveyor arrangement. The merge conveyor arrangement includes two longitudinally extending sections of power driven rollers arranged so as to bias each package towards the center of the conveyor. The merge conveyor arrangement is coupled with an alignment conveyor having a width substantially less than that of the merge conveyor. The alignment conveyor includes a plurality of parallel, angled power rollers which bias each carton toward one lateral edge thereof. Coupled to the alignment conveyor is a main discharge conveyor arrangement including a plurality of longitudinally spaced diverter mechanisms. Positioned adjacent to the main discharge conveyor and each diverter are a plurality of destination conveyors adapted to receive cartons deposited thereon by actuation of the diverter mechanisms.

A control system is provided for sequentially depositing packages from the induction conveyors onto the merge conveyor and for encoding destination information to a computer control for identifying the assigned discharge points for the article with respect to a correspondingly addressed destination conveyor.

BRIEF DESCRIPTION OF THE DRAWINGS

FIG. 1 is a plan view schematically illustrating the overall arrangement of a high speed sorting system in accordance with the present invention;

FIG. 2 is a fragmentary plan view showing in detail by means of broken away sections a portion of the sorter of FIG. 1;

FIG. 3 is a cross-sectional elevational view taken generally along line III—III of FIG. 2;

FIG. 4 is a fragmentary perspective side elevational view of the sorter of FIG. 1 showing the positioning of a diverter mechanism relative to a destination conveyor;

DETAILED DESCRIPTION OF THE PREFERRED EMBODIMENT

Figure 5:
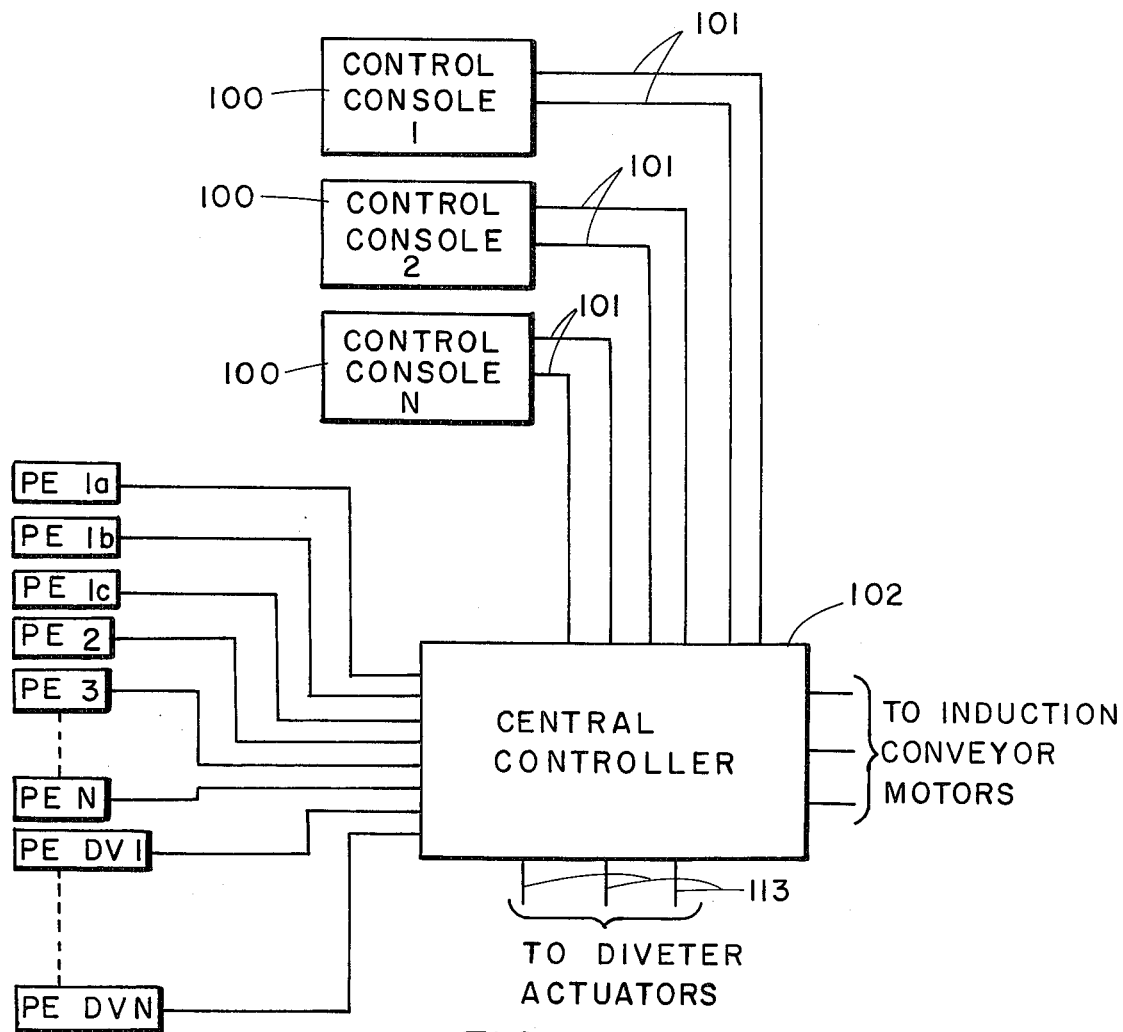
FIG. 5 is a block diagram schematically illustrating a typical control system to be employed with a sorting system in accordance with the present invention.

With reference to the drawings, the high speed sorting system in accordance with the present invention is illustrated in FIG. 1 and generally designated 10. The system 10 includes a plurality of infeed conveyors 12, 14 and 16. Coupled to each infeed conveyor are induction conveyor arrangements 18. Each induction conveyor arrangement is divided into two sections 18a, 18b. Section 18a is a carton receiving section and section 18b is an accelerator section operating at a higher speed than section 18a. These sections are driven by a suitable drive arrangement. Coupled to the induction conveyors is an elongated merge conveyor arrangement 24. Coupled to the merge conveyor arrangement is an alignment conveyor 26. The alignment conveyor 26 discharges cartons or packages 28 onto a longitudinally extending, elongated main discharge conveyor 30. The discharge conveyor 30 includes a plurality of diverter mechanisms DV1, DV2, DV3. Positioned generally perpendicular to the main discharge conveyor 30 at longitudinally spaced points are a plurality of destination conveyors 32.

The infeed conveyors 12, 14 and 16 deposit cartons onto each induction conveyor 18. The infeed conveyors are preferably accumulator type conveyors such as disclosed in commonly owned U.S. Pat. No. 3,768,630 to Inwood et al. entitled ACCUMULATOR WITH AUTOMATIC OVERRIDE and issued Oct. 30, 1973. These conveyors "accumulate" packages or cartons adjacent the inlet to each induction conveyor. They are operable to deposit packages one at a time onto each induction conveyor.

Operator control consoles 34 are positioned adjacent each induction conveyor. The induction conveyors are operated in a manner, which will be more fully described below, to control the induction of cartons onto the merge conveyor section 24. The induction conveyors are interlocked so that cartons are sequentially deposited onto the conveyor 24. The induction system, therefore, serves to prevent collisions between cartons and also provides the necessary spacing for proper operation of the diverter mechanisms. Although only three induction conveyors have been illustrated, it is to be understood that a larger number may be employed to increase the capacity of the system.

As best seen in FIGS. 1 and 2, the merge conveyor 24 includes two longitudinally extending sections 24a and 24b. A plurality of powered, parallel, coplanar rollers 40 make up each section 24a and 24b. As best seen in FIG. 2, the rollers 40 extend between a centrally positioned support rail or channel member 42 and longitudinally extending side rails or channels 44, 46. As shown, the rollers 40 are skewed at an angle θ relative to a line extending perpendicular to the central rail 42 and the side rails 44, 46. The rollers are skewed in opposite directions on each side of the central rail, thus creating a herringbone effect. The rollers of each section are therefore positioned so as to bias the articles to converge toward the central rail 42 in the direction of carton movement. A power drive arrangement 50 is employed to positively rotate each of the rollers 40.

As best seen in FIG. 2, the power drive arrangement 50 includes side channel members 52, 54. Extending between the side channel members are a plurality of pressure rollers 56. As shown, the pressure rollers 56 are positioned below and between adjacent conveyor or carrier rollers 40. A drive belt 58 extends over the pressure rollers 56 and contacts the undersurface of each conveyor roller 40. The drive belt 58 is driven by a suitable motor (not shown) which may be of the electric, hydraulic or pneumatic type. As a result of this arrangement, cartons inducted onto the merge conveyor 24 are biased toward the center of the conveyor and directed toward the alignment conveyor 26.

The alignment conveyor 26 is of a much narrower width than the merge conveyor 24 since it only receives spaced packages or cartons traveling in tandem discharging from the central area of the merge conveyor. As shown, the alignment conveyor 26 includes a plurality of parallel, coplanar rollers 60 driven by another belt type drive 50. The rollers 60 are of the same type as the rollers 40 employed with the merge conveyor 24 and are skewed at an angle φ relative to a line extending perpendicular to the sides of the conveyor 26. The rollers are angled so that they converge in the direction of package movement toward a side rail or guard rail 62. As a result, packages deposited on the alignment section are urged toward one lateral edge thereof. It has been found that biasing the packages in this manner results in more efficient operation of the diverter mechanisms.

The main discharge conveyor 30 is coupled to the alignment conveyor 26 and includes a plurality of parallel, longitudinally spaced, coplanar rollers 70. The rollers 70 are rotatably positioned perpendicular to the sides of the main discharge conveyor 30 and driven by additional belt type drives 50. The lateral edge 72 of the discharge conveyor 30 is positioned adjacent the guard rail 62. As a result, packages are received from the alignment conveyor 26 are generally positioned adjacent this lateral edge. The destination conveyors 32 are positioned at longitudinally spaced points along the discharge conveyor 30. Each destination conveyor may include a plurality of powered rollers 80. These powered rollers 80 are also skewed or angled relative to the sides of the destination conveyors so that cartons deposited thereon will be biased toward longitudinally extending guard rails 82. Other forms of destination conveyors could, of course, be employed. The angled portions of the conveyors 32 permit increased discharge rates from the diverter mechanisms by aiding in the 90° change in direction of movement of the cartons.

Each diverter DV1, DV2, and DV3 includes a pair of transversely extending groups of rollers 90 (FIG. 4). These rollers are angled relative to the longitudinal centerline of the main discharge conveyor to direct cartons to the appropriate destination conveyor. As will be more fully explained below in conjunction with the description of the control section, these diverters are of the solenoid operated, pop-up type. When activated, the rollers 90 pop up and direct a carton onto a corresponding destination conveyor. Various forms of diverters of the solenoid operated, pop-up variety are known. It is preferred, however, that the diverters be of the type disclosed in application for U.S. Pat. Ser. No. 495,402 to Wesley R. Maxted and Bernard H. Woltjer entitled CONVEYOR DIVERTER, filed Aug. 7, 1974, now U.S. Pat. No. 3,983,988 and owned in common herewith.

Figure 6:
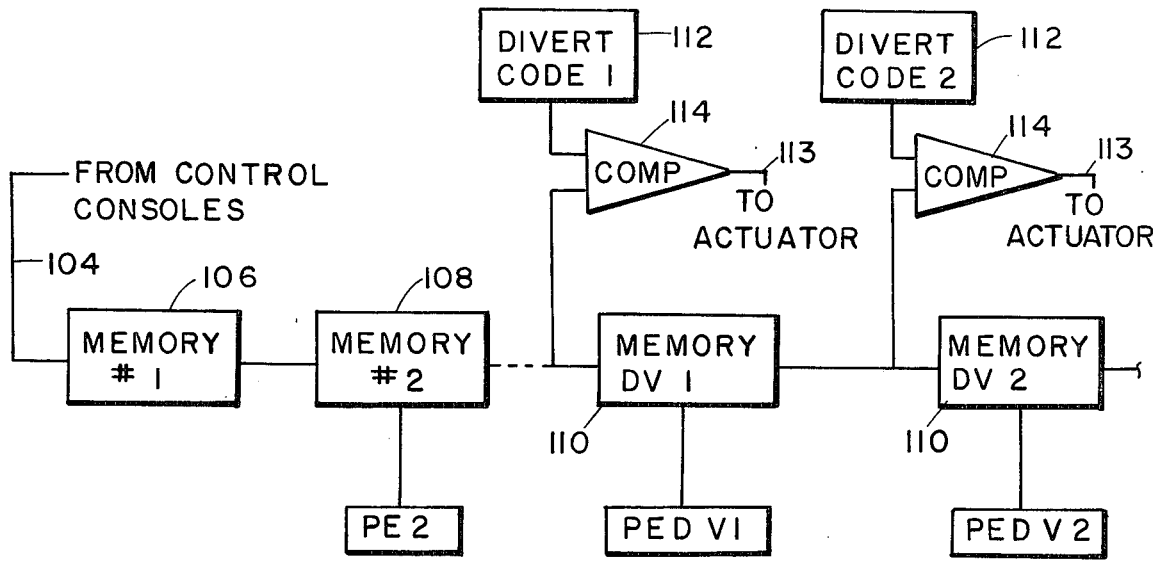
FIG. 6 is a block diagram schematically illustrating a portion of the system of FIG. 5.

One form of control system capable of achieving high speed operation of the present sorter is schematically illustrated in FIGS. 5 and 6. The induction control consoles 34 include operator panels 100 interconnected through a central computer controller 102. One control console is provided for each induction lane. A plurality of photoelectric detectors are employed in conjunction with the central controller 102 and the control consoles 34 to effectuate proper destination control. Each control panel 100 will include an on/off switch, a send button and an encoder keyboard. An operator positioned at the control console will visually determine the contents and select the destination of each carton as it arrives at the induction station and is deposited on the carton receiving section 18a. The operator will then encode the proper destination code information at the control panel 100. This encoding should be completed while the carton is on the receiving section 18a of the induction conveyor. The accelerator section 18b operates at a higher speed to provide proper package spacing and to provide an effective coupling with the merge conveyor 24. This information is fed to the central controller 102 via lines 101 which identifies as assigned discharge point for the article with respect to a correspondingly addressed destination conveyor in a manner described below.

A plurality of photoelectric detectors PE1a, PE1b, and PE1c are positioned adjacent the intake points of each induction conveyor arrangement. These detector units in conjunction with deflectors Ta, Tb and Tc provide an indication to the computer control system 102 that a carton is present at the induction conveyor. The induction conveyors 18 are preferably interlocked through the controller 102 so that only one may operate at a time. This insures proper spacing of the boxes and the sorter. When a box breaks the light beam at the first photoelectric unit, an operator may then encode the proper destination information. This information is impressed across the input terminals 104 of a first memory board 106. A plurality of photoelectric units PE2, PE3, PE4, etc. are positioned along the length of the merge conveyor 24, the alignment conveyor 26 and adjacent each diverter mechanism. These photoelectric units are each connected to a corresponding memory board 108 and act as triggers so that the destination code may be shifted down the length of the conveyor or escorted with the particular carton to operate the preassigned diverter.

The controller 102 preferably controls the induction conveyors so that if a carton is present at the induction conveyor, a code has been entered into the keyboard and a preceding carton released from any lane has cleared the corresponding PE1a, PE1b or PE1c photo unit and the PE2 photo unit, the central controller then automatically actuates the conveyor belts or rollers at the induction conveyor 18 thereby depositing a carton onto the merge section.

As shown in FIG. 6, the destination code information is impressed across the input terminals of memory board 106. The photoelectric detector PE2 is electrically connected to a second memory board 108. A plurality of such memory board and detector combinations are interconnected in series so that the input terminals of each memory board are connected to the output terminals of the preceding memory board.

When a carton is released from an induction station and it breaks the light beam at the photoelectric detector PE2, the memory board 108 will read the code from the first memory board 106 prior to the time the first memory board 106 receives the code from the next induction keyboard station.

As the carton reaches the photoelectric detectors PE3, PE4, etc. along the length of the merge conveyor and alignment conveyor, the photoelectric unit triggers its associated memory board to read the carton's code from the adjacent memory board which is associated with the previous upstream photoelectric detector. As a result, the destination code is escorted down the memory units by the carton triggering the associated triggering photoelectric detectors. As will be readily apparent to those of ordinary skill in the art, a new box must not reach a photoelectric detector before its output terminals have been read. Therefore, the cartons must be spaced a distance greater than the distance between adjacent photoelectric detector units. The diverter mechanisms DV1, DV2, DV3 have photoelectric detector units PEDV1, PEDV2 and PEDV3 associated with corresponding memory boards 110. These photoelectric units are placed for triggering the pop-up diverters. The inputs to memory boards 110 are wired into a BCD decoder which includes a digital switch 112 and a digital comparator 114. The digital switch 112 is programmed for a particular code associated with a particular diverter lane or destination conveyor. When the code number read agrees with the divert code number, the divert "up" solenoid is energized through the central control cabinet 102 and lines 113. If the number disagrees, a "down" solenoid is energized to lower the mechanism.

The control system discussed above should be considered as representative only. Various other systems are available which may be employed with the present high speed sorter to obtain similar results. For example, the control system disclosed in the aforementioned Speaker patent could be adapted to this sorter. Also, a control system of the type disclosed in U.S. Pat. No. 2,985,835 to Stuart, entitled SHIFT REGISTER CIRCUIT and issued on May 23, 1961 could be employed. As a further alternative, the induction sequencing could be manually controlled by operators depressing induction conveyor on/off switches at each control console for manual sequencing and spacing of cartons. A single photoelectric detector could be positioned upstream from each diverter and each carton could have placed on the four sides thereof code indicia capable of being read by the photoelectric detector. If the code indicia corresponds with the particular divert code, the diverter would then be actuated.

In a typical installation, the sections 18a of the induction conveyors would be operated at a speed of 140 feet per minute and the sections 18b, 20b and 22b would be operated at a speed of 275 feet per minute. The merge conveyor section 24 would operate at a speed of 350 feet per minute. The alignment section would operate at a speed of approximately 400 feet per minute. The rollers 70 of the main discharge conveyor 70 would be operated at a speed of approximately 400 feet per minute. The diverter roller groups 90 would operate at a speed of 450 feet per minute. The rollers 40 would be skewed at an angle $\theta$ of 15° and the rollers 60 would be skewed at an angle $\phi$ of 15°. With such an arrangement, sorting capacities of 120 cartons per minute may be achieved.

Various modifications to the system as presently disclosed will become apparent to those of ordinary skill in the art. For example, the number of induction lanes could be increased beyond that illustrated and similarly, the number of destination conveyors employed with the system could be increased. Further, the induction conveyors could take the form of continuous belt conveyors or powered roller conveyors. Further, a single power source, through suitable gearing, could be employed to drive each of the conveyor sections. As expressly intended, therefore, the above description should be considered as that of the preferred embodiment only. The true spirit and scope of the present invention will be determined by reference to the appended claims.

The embodiments of the invention in which an exclusive property or privilege is claimed are defined as follows:

1. A high speed sorter for sorting packages comprising:
    a plurality of infeed conveyors;
    a plurality of induction conveyor means coupled with said infeed conveyors for receiving packages from said infeed conveyors;
    a merge conveyor means coupled with said induction conveyor means for receiving packages from said induction conveyor means and biasing said packages deposited thereon toward a generally centrally located discharge point, said induction conveyor means discharging packages on said merge conveyor means in a spaced relationship said merge conveyor means comprising:
    a support frame including a longitudinally extending central rail and longitudinally extending spaced side rails;
    a first set of power driven rollers rotatably mounted between one of said side rails and said central rail, said rollers being generally parallel to one another and skewed at an angle relative to a line extending perpendicular to said central rail so that said rollers bias articles to converge toward said central rail in the direction of package movement; and
    a second set of power driven rollers rotatably mounted between the other of said side rails and said central rail, said rollers being generally parallel to one another and positioned at an angle relative to a line extending perpendicular to said central rail so that said rollers converge toward said central rail in the direction of package movement, whereby packages inducted onto said merge conveyor at transversely spaced points are biased toward the center of said merge conveyor;

alignment conveyor means coupled with said merge conveyor means for receiving packages from said merge conveyor means and biasing each package toward one edge thereof, said alignment conveyor means including longitudinally extending, spaced, parallel, lateral sides and further comprising:

a plurality of longitudinally spaced, coplanar, parallel rollers, said rollers being skewed at an angle relative to a line extending perpendicular to the sides of said alignment conveyor means; and a longitudinally extending guard rail extending along one lateral side of said alignment conveyor, said rollers converging toward said guard rail in the direction of conveyor movement;

a plurality of destination conveyors; and a main discharge conveyor means coupled with said alignment conveyor means, said discharge conveyor means including at longitudinally spaced points adjacent the destination conveyors, a plurality of diverter means for selectively diverting preselected packages to a predetermined one of said destination conveyor.

2. A high speed sorter as defined by claim 1 further including drive means for rotating said first set of power driven rollers and said second set of power driven rollers at the same speed.

3. A high speed sorter as defined by claim 2 wherein said induction conveyor means comprises:

a carton receiving section;

a carton accelerating section, said accelerating section operating at a speed greater than said carton receiving section; and induction control means for sequentially operating said induction conveyor means so that cartons are discharged onto said merge conveyor means in a spaced relationship.

4. A high speed sorter as defined by claim 3 further including diverter control means operatively associated with each diverter for selectively actuating a predetermined diverter to divert a carton to a preselected destination conveyor.

5. A high speed sorter as defined by claim 4 wherein said diverter control means includes:

a plurality of memory board control means connected in series for receiving a destination code;

a plurality of photoelectric detectors each connected to one of said memory board means for triggering its associated memory board means upon passage of a carton on said sorter, said memory board means reading the code from the preceding memory board means; and a plurality of BCD decoder means equal in number to the number of diverter means connected to the memory board means associated with the photoelectric detectors positioned immediately upstream of the diverter means for comparing the code read by said memory means and actuating said diverter if the code agrees with the preassigned diverter code.

6. A high speed sorter as defined by claim 5 wherein said rollers of each section of said merge conveyor means are skewed at an angle of 15° relative to a line extending perpendicular to said central rail.

7. A high speed sorter as defined by claim 6 wherein the rollers of said alignment conveyor means are skewed at an angle of 15° relative to a line extending perpendicular to the sides of said alignment conveyor means.

8. A sorter as defined by claim 1 further including control means for sequentially actuating said induction conveyor means so that cartons are deposited on said merge conveyor in spaced relationship and for selectively actuating said diverter means so that each carton is diverted to a preassigned destination conveyor.

* * * * *